United States Patent [19]

Rachak

[11] Patent Number: 5,573,661
[45] Date of Patent: Nov. 12, 1996

[54] RETROFIT WASTE VAULT SYSTEM

[75] Inventor: Alexander L. Rachak, Wellington, Colo.

[73] Assignee: The Shane Group, Inc., Hillsdale, Mich.

[21] Appl. No.: 544,605

[22] Filed: Oct. 18, 1995

[51] Int. Cl.⁶ ............................................. C02F 1/04
[52] U.S. Cl. ................... 210/170; 210/188; 210/218; 203/49; 159/16.1; 159/905
[58] Field of Search .................... 210/170, 180, 210/188, 218, 532.2; 203/49; 159/16.1, 905

[56] References Cited

U.S. PATENT DOCUMENTS

| | | | |
|---|---|---|---|
| 1,567,414 | 12/1925 | Bogart. | |
| 3,136,608 | 6/1964 | Lindstrom | 23/259.1 |
| 3,624,665 | 11/1971 | Klingle, Sr. | 4/115 |
| 3,808,609 | 5/1974 | Andersson et al. | 4/133 |
| 3,907,679 | 9/1975 | Yort | 159/16.1 |
| 4,039,451 | 8/1977 | Smith | 210/170 |
| 4,096,592 | 6/1978 | Clark | 4/111 |
| 4,313,234 | 2/1982 | Stewart | 4/449 |
| 4,333,831 | 6/1982 | Petzinyeo | 210/218 |
| 4,343,051 | 8/1982 | Persson | 4/111.1 |
| 4,882,071 | 11/1989 | Bench et al. | 210/170 |
| 4,909,948 | 3/1990 | Eichelberger, Sr. | 210/180 |
| 5,043,061 | 8/1991 | Anagaki | 210/170 |
| 5,171,434 | 12/1992 | Anderson et al. | 210/180 |
| 5,342,516 | 8/1994 | Rachak | 210/218 |

*Primary Examiner*—Christopher Upton
*Attorney, Agent, or Firm*—Duncan F. Beaman

[57] ABSTRACT

A retrofit system for biological treatment sanitation vaults wherein evaporation of the liquid waste is accelerated by locating a conduit within the waste receptacle into which only liquid may flow and evaporate within the conduit in the air flowing therethrough. A double conduit system substantially connected in parallel may be used to evaporate liquids accumulating in vaults receiving heavy use for short durations as a float operated air control system permits the most effective utilization of the air movement through the conduit circuit as automatically controlled by the liquid level.

13 Claims, 2 Drawing Sheets

RETROFIT WASTE VAULT SYSTEM

BACKGROUND OF THE INVENTION

1. Field of the Invention

The invention pertains to a biological waste treating system accelerating the evaporation of liquids which may be retrofitted to existing waste receptacles.

2. Description of the Related Art

Biological waste treatment systems such as found in biological composting toilets are known wherein the apparatus of the waste treating system exposes the waste, which includes liquid and solid matter, to air to accelerate evaporation and decomposition. A number of patents directed to such biological treatment systems are shown in U.S. Pat. Nos. 1,567,414; 3,136,608; 3,624,665; 3,808,609; 4,096,592; 4,313,234 and 4,343,051. Also, in my Patent 5,342,516, a biological waste conversion system is shown wherein the evaporation of the liquid within the waste matter is accelerated by exposure of the liquid to air flow.

While existing apparatus accelerates the evaporation of liquid and decomposition of the solid waste, known biological waste treatment systems require specially constructed waste receiving vaults and containers, and the prior art apparatus is not suitable for use with existing waste receiving receptacles or vaults. As a great number of pre-existing receptacles and vaults are presently in use, it is highly desirable to utilize present technology to improve the decomposition and treatment of waste in such vaults but apparatus for doing so has not heretofore been available.

OBJECTS OF THE INVENTION

It is an object of the invention to provide a biological waste treatment system which may be retrofitted to existing waste receptacles and vaults to accelerate the evaporation of liquids therefrom.

Another object of the invention is to provide a retrofitable liquid evaporation system for existing waste receiving vaults which is of economical construction and may be readily installed without requiring exceptional skills.

Yet another object of the invention is to provide a waste treatment system for evaporating liquids from a waste receiving vault wherein the efficiency of evaporation of the system is not adversely affected under temporary high usage conditions and the evaporation system accommodates itself to the volume of liquid within the vault.

SUMMARY OF THE INVENTION

In the practice of the invention, an airflow conduit system is retrofitted within a conventional waste receiving vault. The conduit system includes an evaporation portion preferably substantially horizontally disposed which is located adjacent the bottom of the vault and the conduit system includes inlet and outlet portions whereby air may travel through the system.

The evaporation portion includes a filter whereby liquids within the vault may flow into the conduit evaporation portion, the solids being excluded, and the flow of air through the conduit system evaporates the liquid therein. Preferably, the outlet portion of the conduit system includes a vertically oriented stack inducing the flow of air through the system as entering the inlet portion, and in the preferred arrangement, an electric blower or fan is located in the stack to insure a rapid flow of air through the conduit system to rapidly evaporate the liquid therein.

In vaults periodically subjected to high usage wherein the liquid accumulation may be greater than the ability of the evaporation system to handle the liquid, a plurality of evaporation portions may be included in the conduit system vertically related to each other so as to handle temporary high usage conditions. In such event, liquid level float operated gates are located within the upper evaporation portions which automatically open as the liquid level increases, and close as the liquid level falls. The use of such float operated control gates assures high efficiency of operation in that maximum air flow takes place through the evaporation portion which is not "flooded" closed, and as the liquid level falls, the upper evaporation portions are closed to air flow so that the liquid level of the waste is reduced to its minimum depth.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENTS

Figure 1:
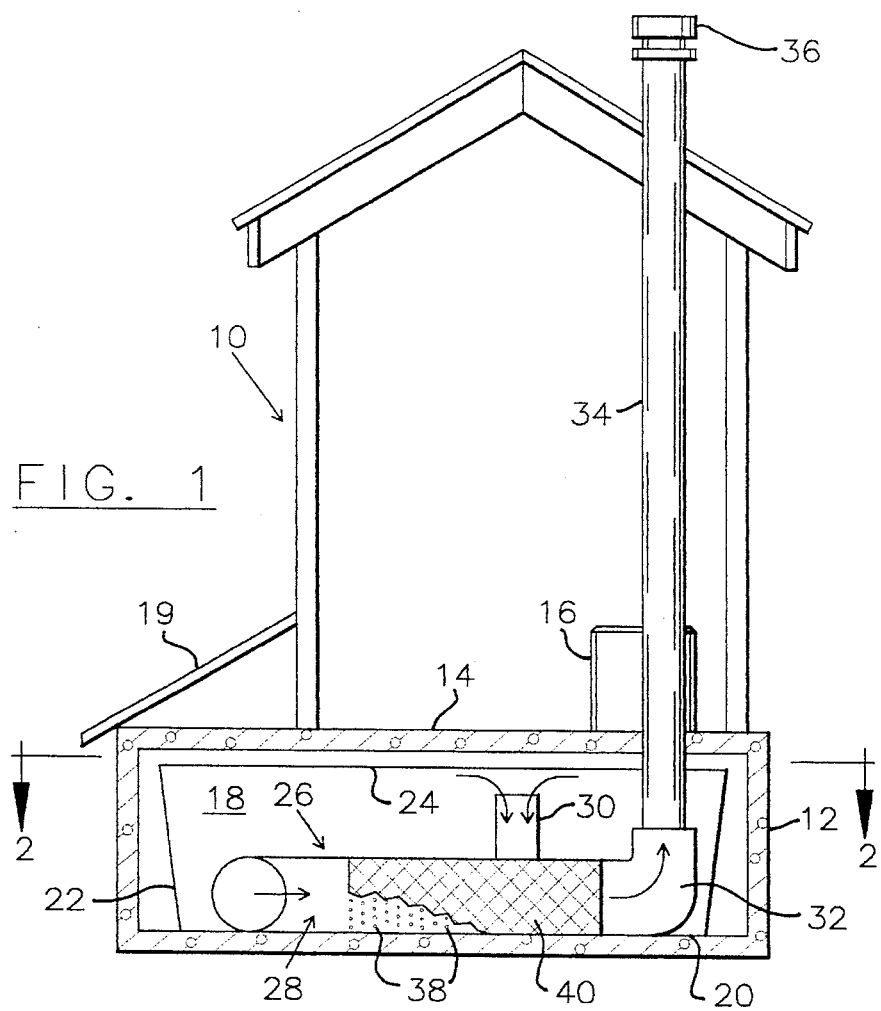
FIG. 1 is an elevational sectional view of a typical waste vault system utilizing the concepts of the invention as taken along Section 1—1 of FIG. 2.
Figure 2:
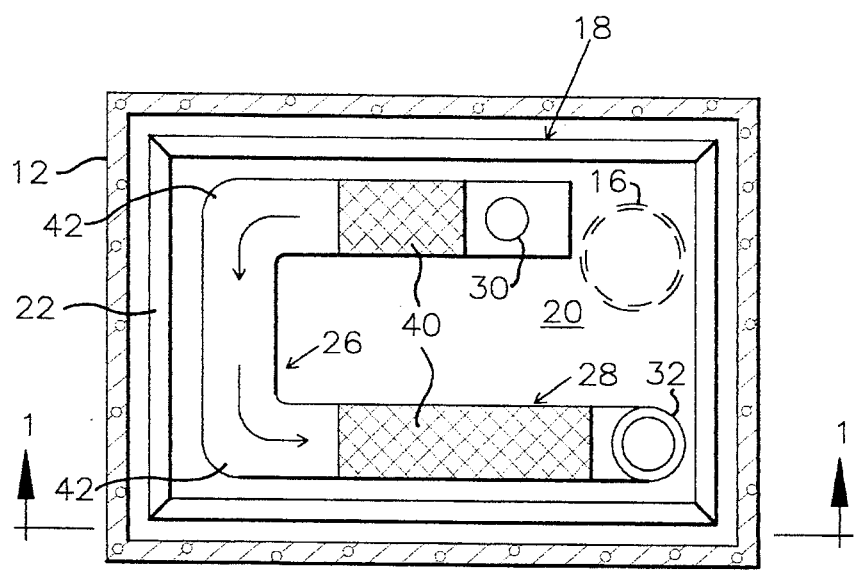
FIG. 2 is a plan sectional view as taken along Section 2—2 of FIG. 1.

The retrofitable biological waste treatment system constituting the invention will normally be employed in restroom and toilet facilities usually located in remote areas wherein sewers and septic tank systems are not available. Such facilities may include a roofed building 10, FIG. 1, having a vault or lower compartment 12 which may be of concrete, steel, glass fibre or plastic and is usually buried in the ground. The building 10 includes the floor 14 which constitutes the top of the vault and a toilet stool 16 located within the building 10 upon floor 14 permits waste to enter the vault 12. As shown in FIGS. 1 and 2, the vault 12 includes a receptacle 18 for receiving the waste, and it is to be appreciated that the receptacle 18 is optional as the vault 12 also constitutes a waste receptacle and is so designated in the following description and claims.

An access door 19 permits the receptacle 18 to be periodically cleaned, and the receptacle 18 includes a bottom 20, vertically oriented sides 22 and an open top 24 whereby the waste enters the receptacle.

The invention includes a conduit system 26 located within the receptacle 18. The conduit system 26 may be formed of synthetic plastic or metal tubular conduits and includes a substantially horizontal evaporation portion 28, an inlet portion 30 which communicates with the evaporation portion 28 and an outlet portion 32 also communicating with the portion 28. A ventilation inducing tubular stack 34 is in communication with the outlet portion 32, and an electric blower or fan 36 is preferably mounted upon the upper end of the stack 34 and may be powered by an electric utility power line, or a battery system charged by a solar panel mounted upon the roof of the building 10.

The conduit system evaporation portion 28 preferably rests upon the receptacle bottom 20, and straight portions of the evaporation portion 28 include a plurality of holes 38, FIG. 1, whereby liquid within the receptacle 18 may enter the evaporation portion 28. To prevent solid waste from entering the evaporation portion 28, and to prevent clogging of the holes 38, a filter mesh 40 of a synthetic plastic type having small openings surrounds the evaporation portion in which the holes 38 are formed. This mesh may consist of a fiber material sold under the trademark Ceotextile. The evaporation portion 28 includes elbows 42 which permit the air flowing through the conduit system 26 to pass through a circuitous system located in the receptacle 18.

In use, liquid and solid waste enters the receptacle 18 through the stool 16. The liquid within the receptacle will pass through the mesh filter 40 and the holes 38 into the horizontal evaporation portion 28 of the conduit system 26. While the stack 34, alone, will produce a flow of air through the conduit system 26 under certain temperature conditions, energizing of the fan 36 will produce a strong flow of air through the conduit system 26 wherein the air will enter the inlet portion 30 as indicated by the arrows, the opening of the inlet portion 30 being located within the vault 12, and after the air has flowed through the evaporation portion 28 and is exposed to the liquid within the horizontal evaporation portion 28 evaporating the liquid, the air and vapor will pass out the outlet portion 32 through the stack 34 and fan 36 to the atmosphere.

The rapid flow of air through the conduit system 26 will rapidly evaporate liquid from the receptacle 18 permitting the dry solid material to biologically decompose, and it is only necessary to clean the solid material from the receptacle 18 through the access door 19 at widely spaced intervals.

Of course, with the embodiment shown in FIG. 2, the most effective operation of the system occurs when the liquid level within the horizontal evaporation portion 28 is less than three-quarters the vertical height of the evaporation portion conduits. There must be enough air flow passage within the evaporation portion conduits to permit air to flow therethrough. As the liquid is evaporated from the receptacle 18, the liquid level diminishes, and under normal operating conditions, the liquid level within the receptacle 18 is only an inch or two and a high rate of air flow through the conduits system 26 is possible.

The conduit system 26, by the use of linear portions and the elbows 42, may be easily retrofitted to existing vaults and receptacles, and as the conduit system is assembled of a plurality of linear and elbow parts, a conduit system of the configuration most apropos to the configuration of the associated receptacle is possible. In the practice of the invention, the liquid level within the receptacle 18 is minimized permitting optimum biological decomposition of the solid waste. Toilet facilities utilizing the concepts of the invention require very little maintenance and the receptacles only need to be cleaned on a six month or one year cycle.

Figure 3:
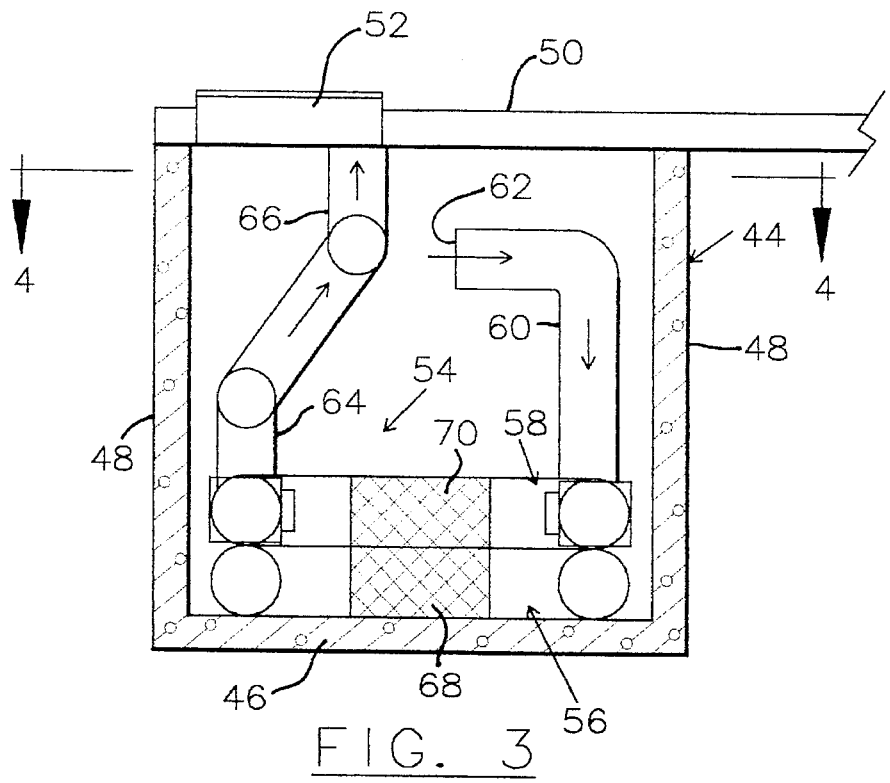
FIG. 3 is an elevational sectional view as taken along Section 3—3 of FIG. 4 of a modification of the invention utilizing a plurality of vertically positioned evaporation portions illustrating the air flow control gates of the upper portion being in the closed condition.
Figure 4:
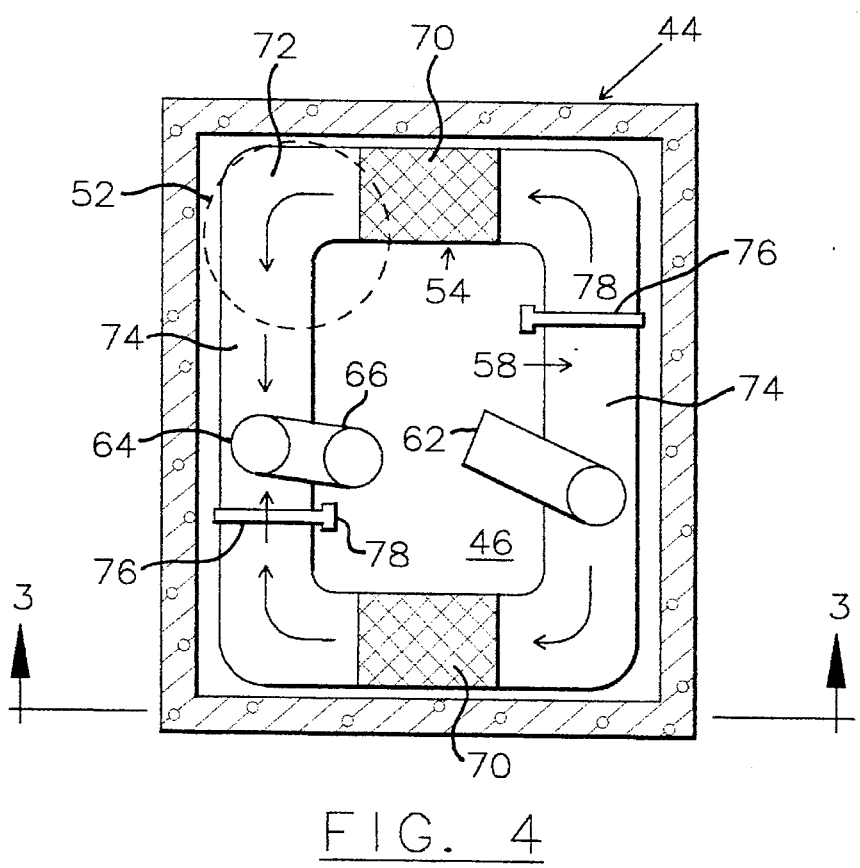
FIG. 4 is a plan view of the embodiment of FIG. 3 as taken along Section 4—4 of FIG. 3.

An embodiment utilizing the inventive concepts is illustrated in FIGS. 3 and 4 wherein the apparatus is capable of handling short duration high volume usage. In the embodiment of FIGS. 3 and 4, cessation of air flow through the conduit system due to "flooding" is prevented and an air flow control system is employed regulated by the level of the liquid within the vault.

In the embodiment of FIGS. 3 and 4, the receptacle or vault is indicated at 44. The receptacle 44 is usually buried in the ground and a building, not shown, will be erected above the receptacle. The receptacle includes a bottom 46, vertically oriented sides 48 and a top 50 which serves as the floor of the building, not shown. Waste enters the receptacle 44 through a toilet stool, urine troughs and the like, not shown, and access to the receptacle 44 is through manhole 52.

The conduit system within the receptacle 44 is generally indicated at 54 and includes horizontally disposed lower evaporation portion 56 and upper evaporation portion 58. As illustrated, the upper portion 58 is mounted upon the lower portion 56. An inlet portion conduit 60 having an open end 62 is located within the receptacle 44 and communicates with both evaporating portions 56 and 58. In a like manner, the conduit system outlet portion 64 communicates with both the lower and upper evaporation portions. A stack portion 66 is in communication with the outlet portion 64, and a vertically oriented stack and electric motor, not shown, may be incorporated into the stack portion 66 as it extends vertically to the atmosphere.

The evaporation portions 56 and 58 are provided with holes surrounded by filter mesh 68 and 70, respectively, and the evaporation portions include elbows 72 similar to the previously described embodiment.

The upper evaporation portion 58 includes straight or linear portions 74 and gates 76 are located within the portions 74. The gates 76 are capable of vertical adjustment relative to the associated portions 74 wherein raising of the gates 76 permits air flow through the upper evaporation portion 58, while lowering of the gates 76 prevents air flow through the upper evaporation portion 58. Vertical positioning of the gates 76 is by means of the floats 78 attached to the gates wherein as the liquid within the receptacle 44 increases, the liquid level will engage the floats 78 raising the gates 76 permitting air flow through portion 58, while as the liquid level descends, the floats 78 will descend therewith lowering the gates 76 and prevent air flow through the evaporation portion 58.

In use, air will flow through the conduit system 54 as indicated by the arrows due to induced air flow through the stack system, or operation of an electric fan, not shown. When liquid within the receptacle 44 of a depth less than the vertical height of the lower evaporation portion 56 it will flow into the portion 56 and be evaporated by the air flow thereover. Because the liquid level within receptacle 44 is less than the vertical height of the portion 56, the floats 78 and gates 76 will be in their lowermost position as shown in FIG. 3 and air flow through the upper evaporation portion 58 is prevented.

Under high usage conditions, the liquid level within the receptacle 44 may temporarily rise above the vertical height of the lower evaporation portion 56 which causes the portion 56 to "flood" preventing air flow therethrough. Such an elevation in the liquid level will cause the floats 78 to lift the gates 76 permitting air flow through the upper evaporation portion 58 so that air may flow through the portion 58 and evaporate the liquid therein. As the liquid level descends, the gates 76 will automatically descend, and the floats 78 will be so positioned relative to the gates 76 that the liquid level will be lower than the upper most portion of the evaporation portion 56 so that air flow through portion 56 is possible before the gates 76 completely close and now shunt all of the air flow through conduit system 54 through the lower evaporation portion 56.

The aforedescribed automatic operation of the air flow through the conduit system 54 permits large temporary usage while still maintaining the efficiency and advantages of the invention.

As with the embodiment of FIGS. 1 and 2, the conduit system shown in FIGS. 3 and 4 may be readily retrofitted to existing biological waste systems, and of course, the conduit systems of both embodiments may also be installed in new units.

It is appreciated that various modifications to the inventive concepts may be apparent to those skilled in the art without departing from the spirit and scope of the invention.

I claim:

1. A retrofitable waste treatment system for waste vaults, the vault comprising a receptacle receiving liquids and solids having a substantially horizontal bottom, upstanding sides and an upper region, comprising, in combination, a conduit system within the receptacle having an evaporation portion, an inlet portion and an outlet portion, said evaporation portion being substantially horizontal and being located adjacent the receptacle bottom for exposure to liquid within the receptacle, liquid pervious filter means defined in said conduit system evaporation portion permitting liquid within the receptacle to enter said evaporation portion while excluding solid waste therefrom, and air flow inducing means associated with at least one of said inlet and outlet portions producing air flow through said evaporation portion to evaporate liquid therein.

2. A retrofitable waste treatment system as in claim 1, said air flow inducing means comprising a vertically oriented stack in communication with said conduit system outlet portions.

3. A retrofitable waste treatment system as in claim 2, said stack having an upper portion and an electric air blower mounted on said stack upper portion in communication therewith.

4. A retrofitable waste treatment system as in claim 1, said air flow inducing means comprising an electric air blower in communication with one of said inlet and outlet portions.

5. A retrofitable waste treatment system as in claim 1, said evaporation portion including tubular conduits and said filter means including perforations defined in said conduits and a screen disposed about said perforations.

6. A retrofitable waste treatment system as in claim 1, said evaporation portion comprising a lower portion and an upper portion vertically spaced above said lower portion, an air flow gate mounted within said upper portion having a first position preventing air flow through said upper portion and a second position permitting air flow through said upper portion, and a float operatively connected to said gate whereby upon liquid within the receptacle attaining a predetermined level said float will shift said gate from said first position to said second position.

7. A retrofitable waste treatment system as in claim 6, said float being located above said lower evaporation portion.

8. A retrofitable waste treatment system for waste vaults, the vault comprising a receptacle receiving liquids and solids having a substantially horizontal bottom, upstanding sides and an upper region, comprising, in combination, a conduit system within the receptacle having an upper and lower evaporation portions, an inlet portion and an outlet portion, said inlet and outlet portions being in communication with both said upper and lower evaporation portions, said evaporation portions being substantially horizontal, said lower portion being located adjacent the receptacle bottom and said upper portion being located above said lower portion, liquid pervious filter means defined in said upper and lower evaporative portions permitting liquid within the receptacle to enter said evaporative portions while excluding solid waste therefrom, air flow control means located within said upper portion controlling air flow therethrough in dependence upon the liquid level within the receptacle, and air flow inducing means associated with at least one of said inlet and outlet portions producing air flow through said evaporation portions to evaporate liquid therein.

9. A retrofitable waste treatment system as in claim 8, said air flow inducing means comprising a vertically oriented stack in communication with said conduit system outlet portions.

10. A retrofitable waste treatment system as in claim 9, said stack having an upper portion and an electric air blower mounted on said stack upper portion in communication therewith.

11. A retrofitable waste treatment system as in claim 8, said air flow inducing means comprising an electric air blower in communication with one of said inlet and outlet portions.

12. A retrofitable waste treatment system as in claim 8, said evaporation portions including tubular conduits and said filter means including perforations defined in said conduits and a screen disposed about said perforations.

13. A retrofitable waste treatment system as in claim 8, said air flow control means comprising an air flow gate mounted within said upper portion having a first position preventing air flow through said upper portion and a second position permitting air flow through said upper portion, and a float operatively connected to said gate whereby upon liquid within the receptacle attaining a predetermined level said float will shift said gate from said first position to said second position.

* * * * *